Nov. 18, 1958     W. F. EDDY     2,860,624
MANUALLY PORTABLE CHARCOAL BROILER
Filed Jan. 25, 1954
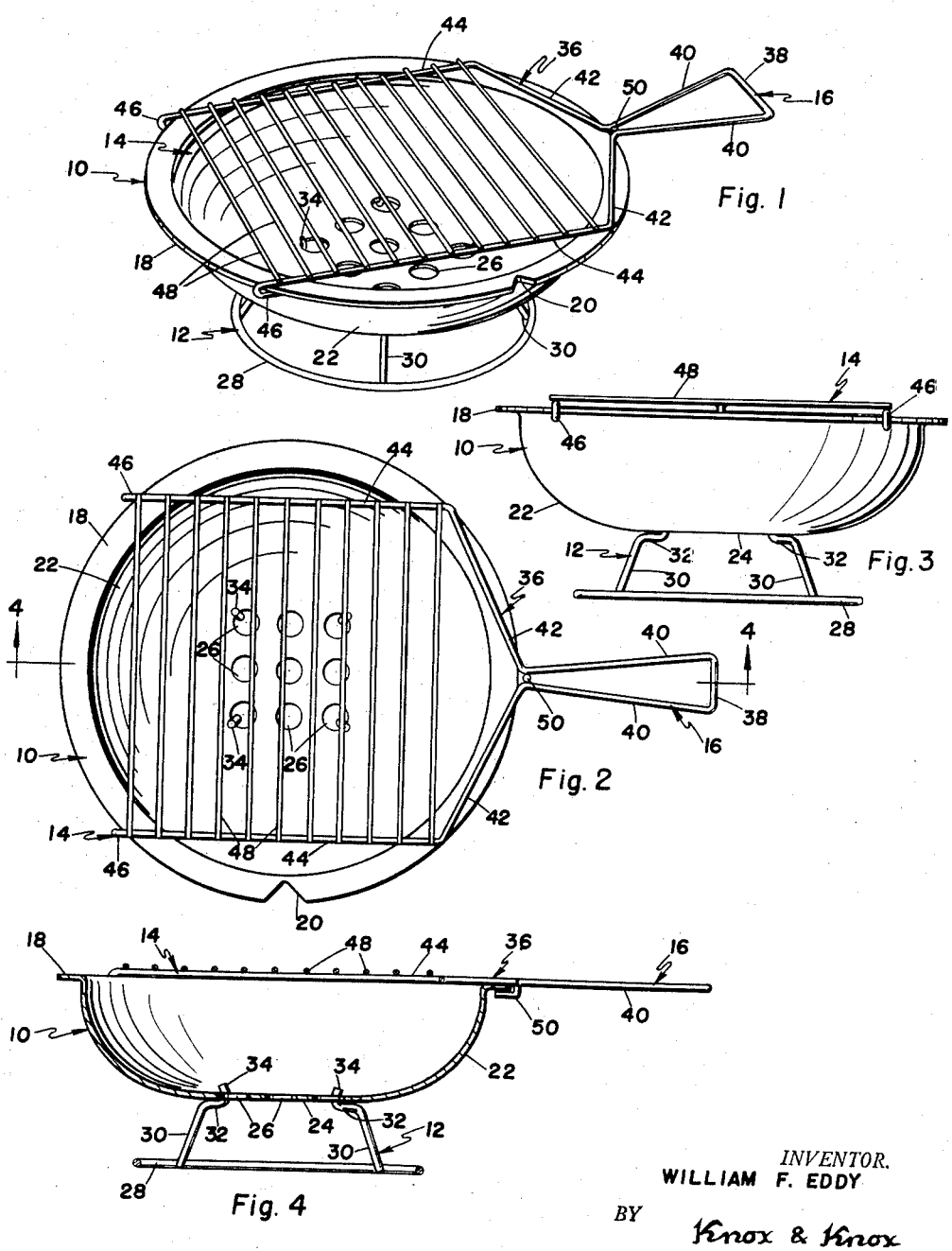
INVENTOR.
WILLIAM F. EDDY
BY *Knox & Knox*
ATTORNEY IN FACT
FOR APPLICANT United States Patent Office 2,860,624
Patented Nov. 18, 1958

2,860,624
MANUALLY PORTABLE CHARCOAL BROILER
William F. Eddy, La Jolla, Calif.
Application January 25, 1954, Serial No. 405,689
2 Claims. (Cl. 126—25)

The present invention relates generally to cooking equipment and more particularly to a manually portable charcoal broiler.

The primary object of this invention is to provide a charcoal broiler which may be carried easily in one hand and is simple to dismantle for cleaning and storage.

Another object of this invention is to provide a charcoal broiler comprising a dished pan fitted with a detachable base stand and grill, the pan having a perforated bottom portion to facilitate igniting the charcoal.

Another object of this invention is to provide a charcoal broiler having a combination grill and carrying handle which is quickly detachable from the pan.

Another object of this invention is to provide a charcoal broiler in which the base stand and pan are so designed that the device may be placed over a gas jet, stove or other heat source so that the charcoal in the pan may be ignited efficiently through the perforations in the pan.

Another object of this invention is to provide a charcoal broiler which is adapted for fabrication from many different materials, so that the choice of material can be according to the dictates of availability and price considerations, the exact sizes and proportions being matters easily determined to suit the particular conditions and needs.

Another object of this invention is to provide a charcoal broiler which is inexpensive and practicable to manufacture.

Finally, it is an object to provide a charcoal broiler of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Fig. 1 is a perspective view of the charcoal broiler.
Fig. 2 is a top plan view of the device.
Fig. 3 is an end elevation view taken from the left end of Fig. 2.
Fig. 4 is a sectional view taken on the line 4—4 of Fig. 2.

Referring now to the drawing, the charcoal broiler comprises a dished pan 10 having a detachable base stand 12 and a grill 14 combined with a unitary handle 16.

The pan 10 has a generally flat rim 18 extending outwardly therefrom, said rim having a notch 20 at a convenient position therein. The dished or bowl portion 22 of the pan 10 has a substantially flat bottom portion 24 in which are a plurality of perforations 26. For convenience the perforations 26 are illustrated as being symmetrically arranged in a square pattern, although many different arrangements are equally suitable.

The base stand 12 comprises a ring 28, of metal rod or the like, to which are secured four upwardly extending legs 30 of like material. The legs 30 slope inwardly and have inwardly turned generally horizontal portions 32 adjacent to their upper ends and constituting seats upon which the flat bottom portion 24 of the pan rests. These horizontal portions are further upwardly turned at their ends to form hooks 34 which are bent slightly outwardly as shown in Fig. 4. The base stand 12 is attached to the pan 10 by inserting the hooks 34 through the corresponding perforations 26, the resiliency of the legs 30 being sufficient to hold the base stand firmly in place.

The grill 14 and handle 16 are portions of a unitary frame 36 of metal rod. The handle 16 is of elongated triangular shape for simplicity, having an end portion 38 and side rods 40, said side rods being outwardly bent at their inner ends to form end bars 42. The end bars 42 are further bent to lie substantially parallel to the axis of the handle 16 and constitute the spaced longitudinal side bars 44 of the grill 14. The ends of the side bars 44 are downwardly disposed and return folded to form hooks 46 which engage the rim 18. The grill 14 is completed by a plurality of cross bars 48 secured at their ends to the side bars 44 and arranged in spaced parallel relation.

At the apex of the handle 16 is a downwardly depending L-shaped locking hook 50 which engages the rim 18, said locking hook being secured between and joining the side rods 40 of said handle.

The grill 14 is detached from the pan 10 by rotating the grill until the locking hook 50 registers with the notch 20. The grill may then be lifted by the handle 16 to disengage the locking hook 50 and shifted to release the hooks 46 from the rim 18. The method of replacing the grill 14 is obvious and it will also be evident that the device may be conveniently carried by means of the handle 16 when said grill is attached to the pan 10.

In order to use the broiler the required amount of charcoal is placed in the pan 10 and ignited through the perforations 26. This is best accomplished by standing the broiler over a gas jet or one of the rings of a gas stove, the base stand 12 serving to hold the pan in position until the charcoal is satisfactorily ignited. After the charcoal is ignited, the broiler may be carried to the desired location and set on a convenient surface, a suitable plate or asbestos mat being placed beneath the pan if required.

The particular design of the charcoal broiler enables it to be used in a fireplace or outdoors with equal success, and for compact storage or shipment, the base stand 12 may be detached and placed inside the pan 10.

Although many different materials may be used for the construction of the pan 10, a particularly suitable material is sheet steel coated with ceramic material, the process of manufacture being well known to those skilled in the art.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A portable charcoal broiler comprising a dished pan forming a fire chamber and having an outwardly extending rim, a unitary grill and handle detachably secured to said rim, said grill constituting a frame having a pair of spaced, parallel side bars, hooks at the ends of said side bars shaped to engage said rim, and a plurality of spaced parallel cross pars secured transversely to said side bars, said handle comprising an extension of said frame, a locking hook secured to said frame adjacent said handle and engaging said rim, a notch in said rim, said grill being rotatable on said pan whereby said locking hook may be passed through said notch in one position to release the grill from the pan, said pan having a perforated bottom portion, and a base stand detachably secured beneath said pan.

2. A portable charcoal broiler comprising a dished pan forming a fire chamber and having an outwardly extending rim, a unitary grill and handle detachably secured to said rim, said grill constituting a frame having a pair of spaced, parallel side bars, hooks at the ends of said side bars shaped to engage said rim, and a plurality of spaced parallel cross bars secured transversely to said side bars, said handle comprising an extension of said frame, a locking hook secured to said frame adjacent said handle and engaging said rim, a notch in said rim, said grill being rotatable on said pan whereby said locking hook may be passed through said notch in one position to release the grill from the pan, a base stand detachably secured beneath said pan, and a plurality of perforations in the lower portion of said pan, said base stand having resilient hook means engageable in certain of said perforations.

References Cited in the file of this patent

UNITED STATES PATENTS

| | | |
|---|---|---|
| 700,228 | O'Brien | May 20, 1902 |
| 931,557 | Barney | Aug. 7, 1909 |
| 936,619 | Foy | Oct. 12, 1909 |
| 1,476,542 | Rasmussen | Dec. 4, 1923 |
| 1,831,834 | Yeager | Nov. 17, 1931 |
| 1,876,358 | Stough | Sept. 6, 1932 |
| 2,487,605 | Smith | Nov. 8, 1949 |
| 2,575,082 | Wolff | Nov. 13, 1951 |
| 2,593,077 | Vogt | Apr. 15, 1952 |
| 2,641,243 | Goss | June 9, 1953 |
| 2,667,392 | Sexton | Jan. 26, 1954 |
| 2,780,215 | Vacanti | Feb. 5, 1957 |